United States Patent
McCoy (10) Patent No.: US 9,993,710 B1
(45) Date of Patent: Jun. 12, 2018

(54) SPORTS APPARATUS

(71) Applicant: Johnny McCoy, Garland, TX (US)

(72) Inventor: Johnny McCoy, Garland, TX (US)

(*) Notice: Subject to any disclaimer, the term of this patent is extended or adjusted under 35 U.S.C. 154(b) by 0 days. days.

(21) Appl. No.: 14/847,887

(22) Filed: Sep. 8, 2015

Related U.S. Application Data (60) Provisional application No. 62/047,506, filed on Sep. 8, 2014.

(51) Int. Cl.
| | |
|---|---|
| A63B 67/00 | (2006.01) |
| A63B 69/36 | (2006.01) |
| A63B 69/00 | (2006.01) |
| F16B 7/10 | (2006.01) |

(52) U.S. Cl.
CPC ...... *A63B 69/0095* (2013.01); *A63B 69/0002* (2013.01); *F16B 7/10* (2013.01); *A63B 2225/093* (2013.01)

(58) Field of Classification Search
USPC ...... 473/416, 442, 447, 479; 482/83, 86, 87, 482/89
See application file for complete search history.

(56) References Cited

U.S. PATENT DOCUMENTS

| | | | | |
|---|---|---|---|---|
| 3,366,381 A * | 1/1968 | Ross | ...... | A63K 3/043 482/17 |
| 3,384,367 A * | 5/1968 | Baum | ...... | A63K 3/043 482/17 |
| 3,399,891 A * | 9/1968 | McCormick | ...... | A63B 69/345 267/176 |
| 3,780,663 A * | 12/1973 | Pettit | ...... | A61G 7/1015 104/307 |
| 4,252,063 A * | 2/1981 | Brooks, Jr. | ...... | A61H 3/008 104/307 |
| 6,261,195 B1 * | 7/2001 | Shingleton | ...... | A63B 69/345 473/438 |
| 6,348,028 B1 * | 2/2002 | Cragg | ...... | A63B 69/201 434/248 |
| 6,464,208 B1 * | 10/2002 | Smith | ...... | A61H 3/008 212/97 |
| 6,523,707 B2 * | 2/2003 | Liu | ...... | A45B 19/04 211/206 |
| 6,530,867 B2 * | 3/2003 | Schwendemann | ... | A63B 69/004 482/83 |

(Continued)

OTHER PUBLICATIONS

The Dallas Morning News, May 8, 2003, (1 page).

(Continued)

*Primary Examiner* — Nini Legesse
(74) *Attorney, Agent, or Firm* — DLA Piper LLP (US)

(57) ABSTRACT

A sports apparatus, comprising: at least two support columns, and at least two base structures coupled to the at least two support columns. At least one horizontal support bar is coupled to the at least two support columns. The at least one horizontal support bar is moveable and/or adjustable, and comprises at least two openings. At least one connector, disposed entirely below the lower surface of the at least one horizontal support bar, comprises at least two connecting point coupling the at least one connector to the at least one horizontal support bar at a lower surface of the at least one horizontal support bar by engaging with the at least two openings in the at least one horizontal support bar.

15 Claims, 14 Drawing Sheets

(56) References Cited

U.S. PATENT DOCUMENTS

| | | | | |
|---|---|---|---|---|
| 7,278,959 B2 * | 10/2007 | Brown, III | ......... | A63B 21/0783 |
| | | | | 482/104 |
| 7,468,023 B2 * | 12/2008 | Wu | ........................ | A47D 13/04 |
| | | | | 482/66 |
| 7,494,450 B2 * | 2/2009 | Solomon | .............. | A61H 1/0229 |
| | | | | 482/51 |
| 7,658,699 B1 * | 2/2010 | Johnson, Jr. | ......... | A63B 69/201 |
| | | | | 482/83 |
| D624,981 S * | 10/2010 | Forrest, Sr. | .................. | D21/788 |
| 8,109,862 B2 * | 2/2012 | Cooper | .................. | A63B 17/00 |
| | | | | 482/83 |
| 2004/0033863 A1 * | 2/2004 | Carlson | ................ | A63B 21/023 |
| | | | | 482/10 |
| 2004/0259689 A1 * | 12/2004 | Wilkins | .................. | A63B 5/00 |
| | | | | 482/8 |
| 2009/0023566 A1 * | 1/2009 | Florczak | .................. | A63B 1/00 |
| | | | | 482/142 |

OTHER PUBLICATIONS

Hammon, S., "Top 10 Holiday Volleyball Gift Guide", Printed form Internet archive at URL: http://volleball.about.com/cs/vballproducts/tp/holidayover50.htm, archived Jun. 18, 2006 (2 pages).

Drawings, undated but taken prior to Sep. 8, 2013, (2 pages).

* cited by examiner

SPORTS APPARATUS

CROSS-REFERENCE TO RELATED APPLICATIONS

This application claim the benefit of U.S. Provisional Application No. 62/047,506 filed Sep. 8, 2014, which is incorporated by reference in its entirety.

DETAILED DESCRIPTION OF EMBODIMENTS

Figure 1A:
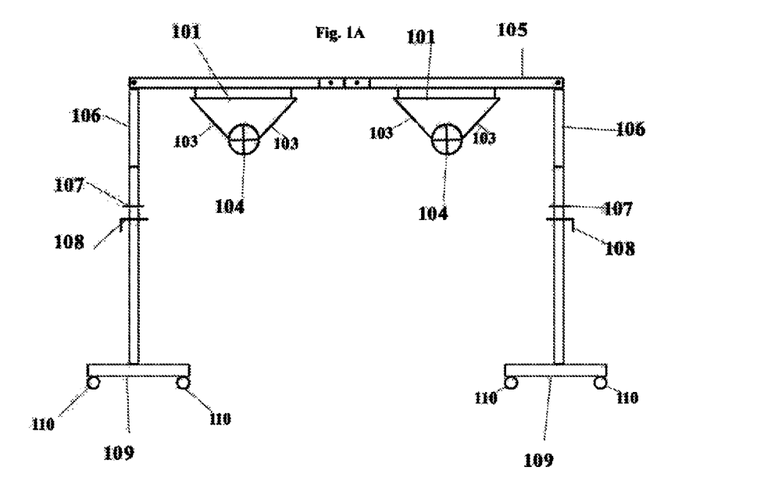
FIG. 1A is a front view of an embodiment of a sports apparatus.

An embodiment of the sports apparatus 100 is shown in FIG. 1A. This sports apparatus may be used to practice skills in a sport, such as, but not limited to, volleyball and/or basketball. This embodiment may comprise at least one support column 106, which may be moveable and/or adjustable, and which may be coupled to at least one base structure 109 which may be mobile in some embodiments, and at least one horizontal support beam 105 which may be movable and/or adjustable in some embodiments.

Figure 5:
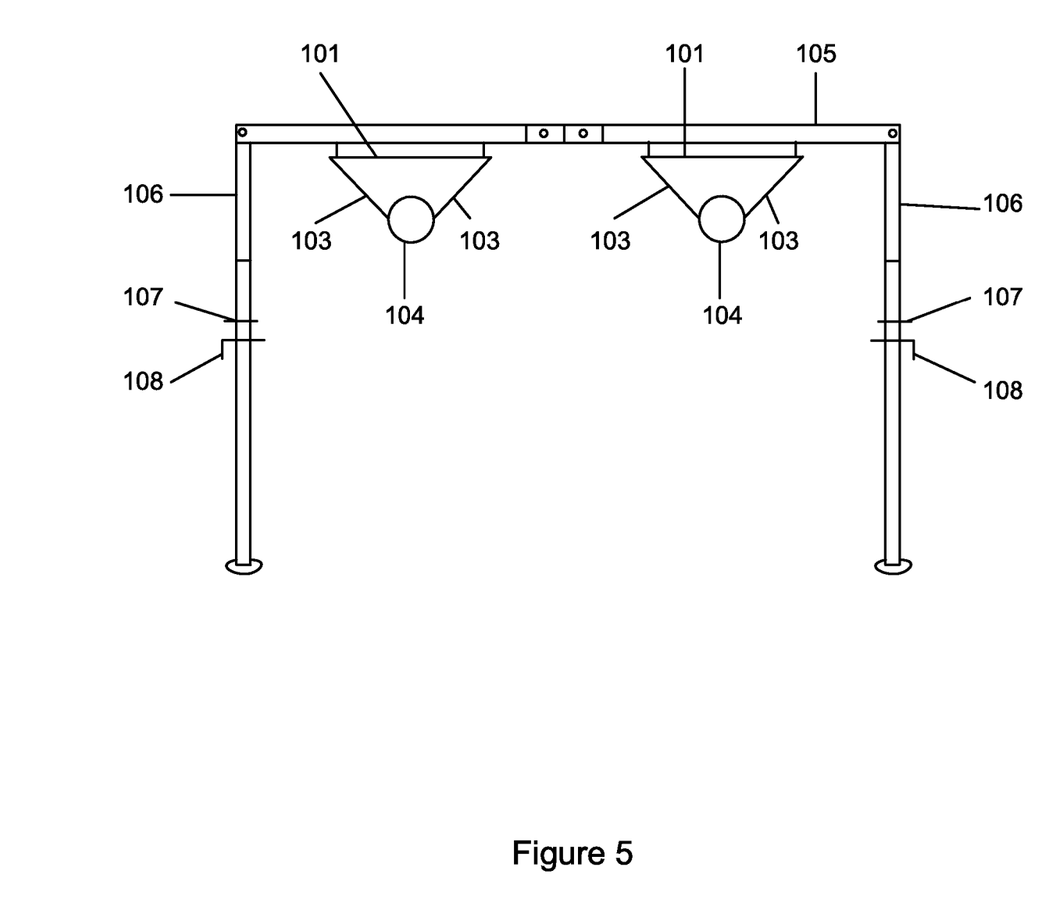
FIG. 5 is a front view of an embodiment of the sports apparatus where base support holes are utilized.

In some embodiments, a base support hole 519 (e.g., shown in FIG. 5) may be used instead of a base structures 109. Base support holes 519 may be made by forming a hole in a material (e.g., sand, wood floor, tile floor, etc.). Base support holes 519 may be permanent or temporary. In some embodiments, permanent base support holes may be coated with a material such as metal, plastic, or some other material.

In some embodiments, support columns 106 may be further coupled to at least one crank 108 that may allow the support columns 106 to be raised or lowered. In some embodiments, a sliding pin 107 may fix the position of the support columns 106 and may allow the position to be locked in place.

In the embodiment of FIG. 1, at least two base structures 109, which may be coupled to the support columns 106, may provide support for the support columns 106 and may allow the sports apparatus to be moved, adjusted, and/or locked into place. In some embodiments, each mobile base structure 109 may have the dimensions of 36"×40". The mobile base structures 109 may include a hollow cavity and cap, allowing the mobile base structures to be filled with fluids (e.g., water and/or another fluid material) and/or solid particles (e.g., sand and/or another solid material), or some other material. In some embodiments, the base structures 109 may also be coupled to a plurality of wheels 110 or otherwise constructed (e.g., in a manner that allows sliding) so that the sports apparatus may be moved to a desired location.

FIG. 1 also illustrates a horizontal support bar 105. Horizontal support bar 105 may comprise one piece or multiple pieces. in some embodiments, the horizontal support bar 105 may be able to pivot into substantially horizontal or vertical positions through a multitude of joints. In alternate embodiments, horizontal support bar 105 may be otherwise or additionally moveable, such as by having one side of horizontal support bar 105 fit into another side of horizontal support bar 105. This may allow for ease of shipping, storage, adjustability, or mobility, or any combination thereof. In alternate embodiments, multiple horizontal support bars 105 may be used to support ease of mobility, adjustability, shipping, and storage.

Figure 1B:
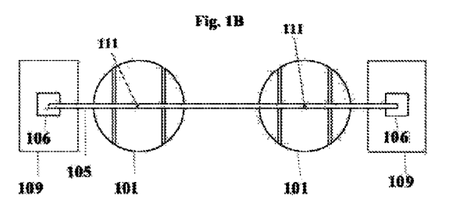
FIG. 1B is a top view of an embodiment of the sports apparatus.
Figure 1C:
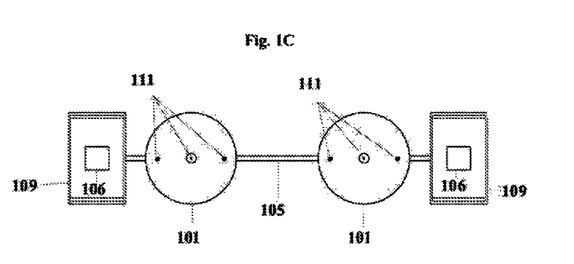
FIG. 1C is a bottom view of an embodiment of the sports apparatus.
Figure 1D:
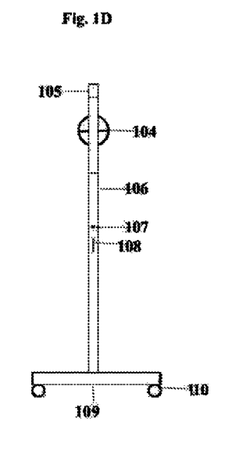
FIG. 1D illustrates left and right side elevation views of an embodiment of the sports apparatus.

FIG. 1A also illustrates at least two connectors 101. In some embodiments, one connector 101 may be used. In other embodiments, two or more connectors 101 may be used. An connector may also be referred to herein as an angle ring, and can be a connector of any shape that connects to the ties 103. Thus, the connector may be a circle, triangle, square, or any other shape or configuration (e.g., such as a team logo or an abstract form). For example, in an embodiment shown in FIG. 1A, the connector 101 may be a circular disk with the dimensions of 40"×40". Alternatively, in an embodiment shown in FIGS. 9A-9B (9A is a bottom view and 9B is a top view), the connector 101 is a substantially circular disk with small rectangularish endpoints. In some embodiments, endpoints (e.g., the rectangularish endpoints) can also be used to connect (e.g., by tying around or going thru an opening in the horizontal support bar 105) the connector 101 to the horizontal support bar 105. Furthermore, in some embodiments, connectors 101 may have one, two, or three holes 111 that may allow one or more ties 103 (e.g., rope, cable, bungee cord, or any combination thereof) to be coupled to the connector 101. In some embodiments, the ties 103 may be 2-3 feet long, and may allow for a ball to be centered in the connector. In some embodiments, one tie 103 may be coupled to the connector 101 through a single hole 111 in the center of the connector 101, as shown in FIG. 1B. In other embodiments, two or more ties 103 may be coupled to the connector 101 through holes 111 in the connector 101 as shown in FIG. 1C. In some embodiments, ties 103 may be coupled to the connector 101 through any combination of holes 111 through the connector 101. Note that the tie 103 can be made of any kind of material and that different kinds of ties can be utilized on one embodiment of the sports apparatus. For example, if there are three holes 111, the two side ties 103 may be cable and the center tie 103 may be a bungee cord.

Figure 4:
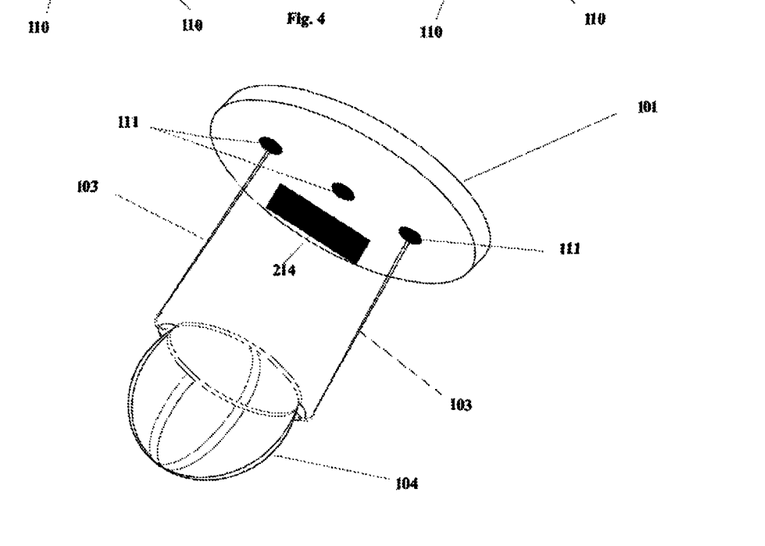
FIG. 4 is a perspective view of the connector, harness, and ties according to an embodiment of the sports apparatus.
Figure 9A:
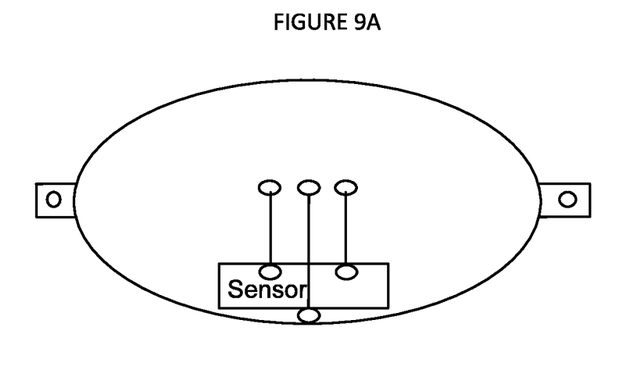
FIGS. 9A-9D illustrate views of the connector, harness and ties, according to embodiments of the sports apparatus.
Figure 9B:
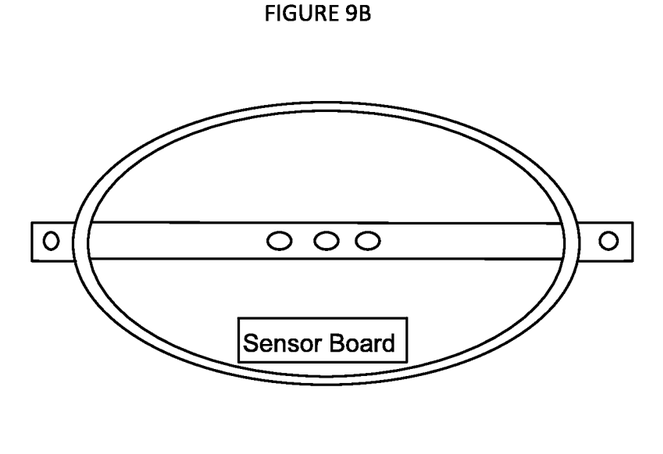
Figure 9C:
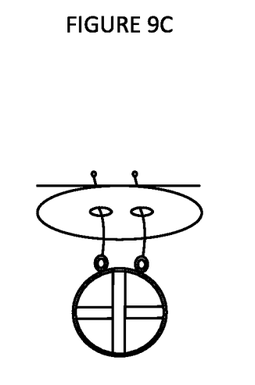
Figure 9D:
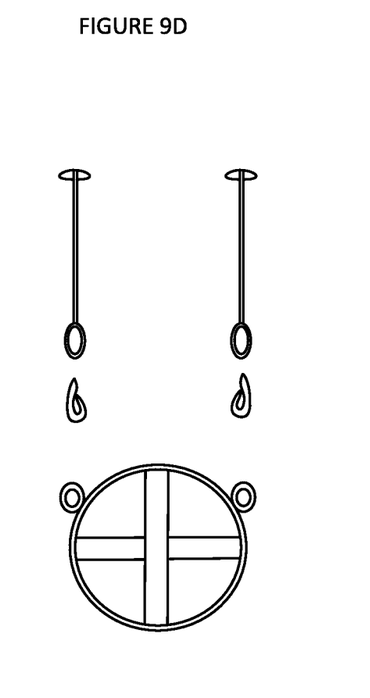

FIGS. 9A-9C illustrate how the tie 103 may be attached to the connector 101 and the ball. A tie 103 may connect to the horizontal support bar 105 by tying around the bar or going through an opening in the horizontal support bar 105. FIG. 1 also illustrates a harness 104, which may be attached to the ties 103. FIG. 4 further illustrates a perspective view of an connector 101, ties 103, and harness 104. In some embodiments, a harness 104 allows for a ball to be used in connection with the sports apparatus 100. In some embodiments, the harness 104 may be coupled to at least one tie 103, passing through holes 111 in an connector 101, that may allow the ball to make contact with a sensor 213 when struck. The sensor 213 may be used for sensing: speed, force, or impact, or any combination thereof. In some embodiments, the ties 103 may be coupled to a harness 104 using clips or hooks, and in other embodiments, the ties 103 may be coupled to a harness 104 by tying the ties to the harness 104. FIG. 9D illustrates how the ties 103 may be connected to the harness 104 using clips that clip onto a loop on the tie 103 and also to a loop on the harness 104. In other embodiments, the ties 103 may be connected to the harness in another manner, such as by sewing or some other mechanism. In some embodiments, the ties 103 may connect directly to the ball by going through a hole in the ball or being glued or otherwise attached to the ball.

Figure 2A:
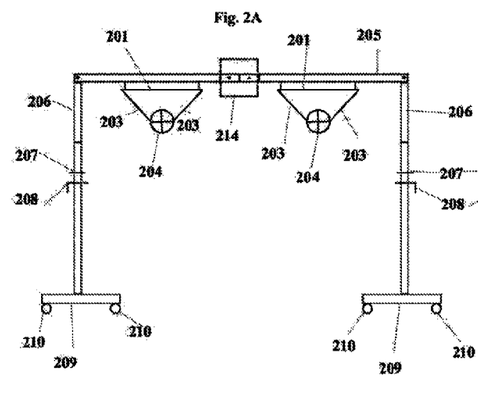
FIGS. 2A & 2B are front views of embodiments of the sports apparatus.
Figure 2B:
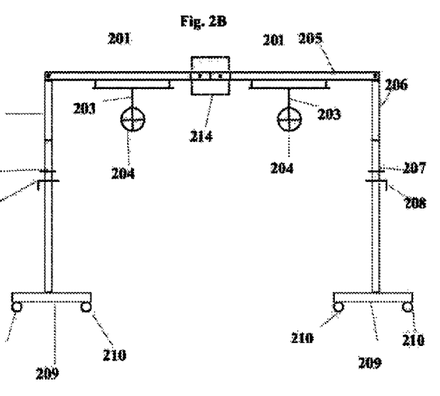
Figure 2C:
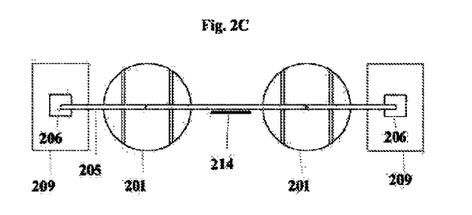
FIG. 2C is a top view of an embodiment of the sports apparatus.
Figure 2D:
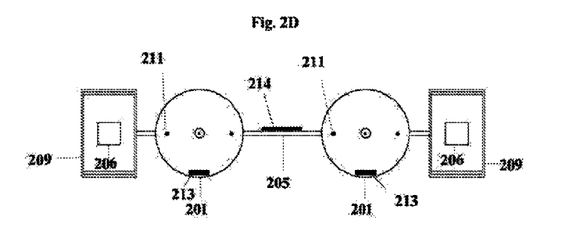
FIG. 2D is a bottom view of an embodiment of the sports apparatus.
Figure 2E:
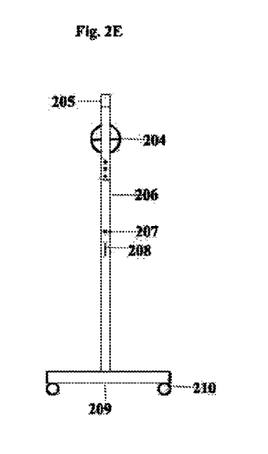
FIG. 2E illustrates left and right side elevation views of an embodiment of the sports apparatus.
Figure 3:
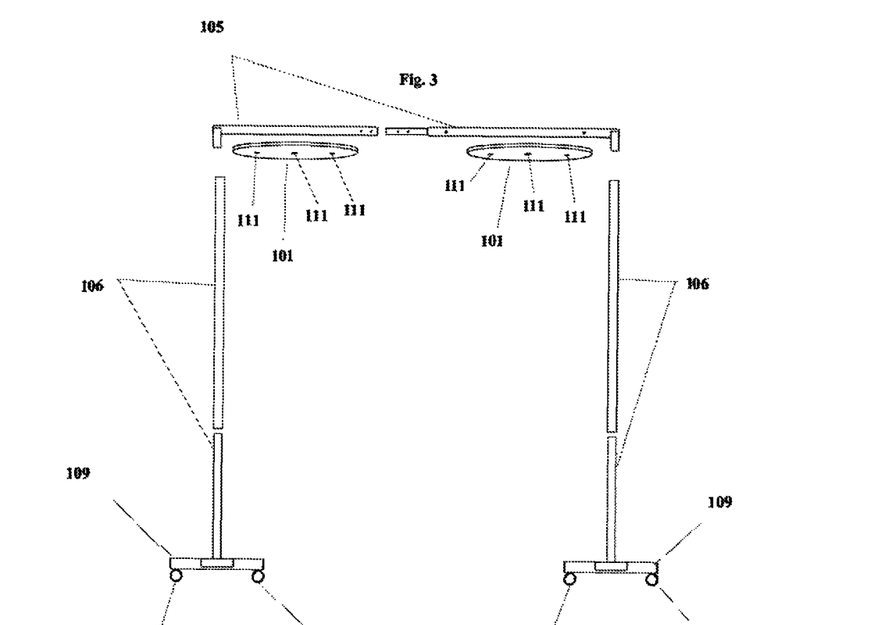
FIG. 3 is an exploded view of horizontal movable support bars, movable support columns, and mobile base structures, according to an embodiment of the sports apparatus.

FIGS. 2A and 2C-2E illustrates an embodiment of the sports apparatus 100 which is similar to the embodiment shown in FIGS. 1A-1D, but which may also comprise a monitor 214 which may be coupled to a horizontal support bar 105 in some embodiments. The monitor 214 may receive signals from at least one sensor 213 and may be able to show the force applied to a ball when spiked. The sensors 213 may be coupled to an connector 101 in some embodiments. FIG. 2B illustrates an embodiment of the sports apparatus 100 that is similar to the embodiment shown in FIG. 2A, except that the ball is connected to the connector 101 through a hole in or about the middle of the connector 101.

Figure 8A:
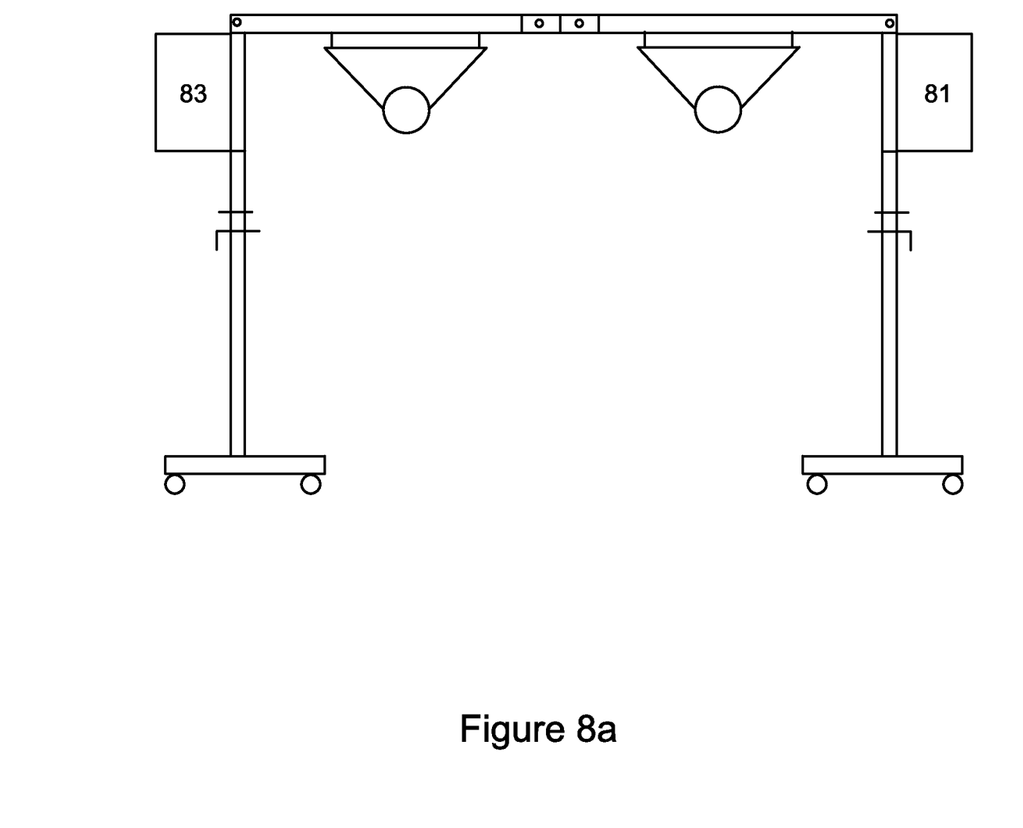
FIGS. 8A-8D illustrate embodiments of a sports apparatus where a monitor displaying information is used.
Figure 8B:
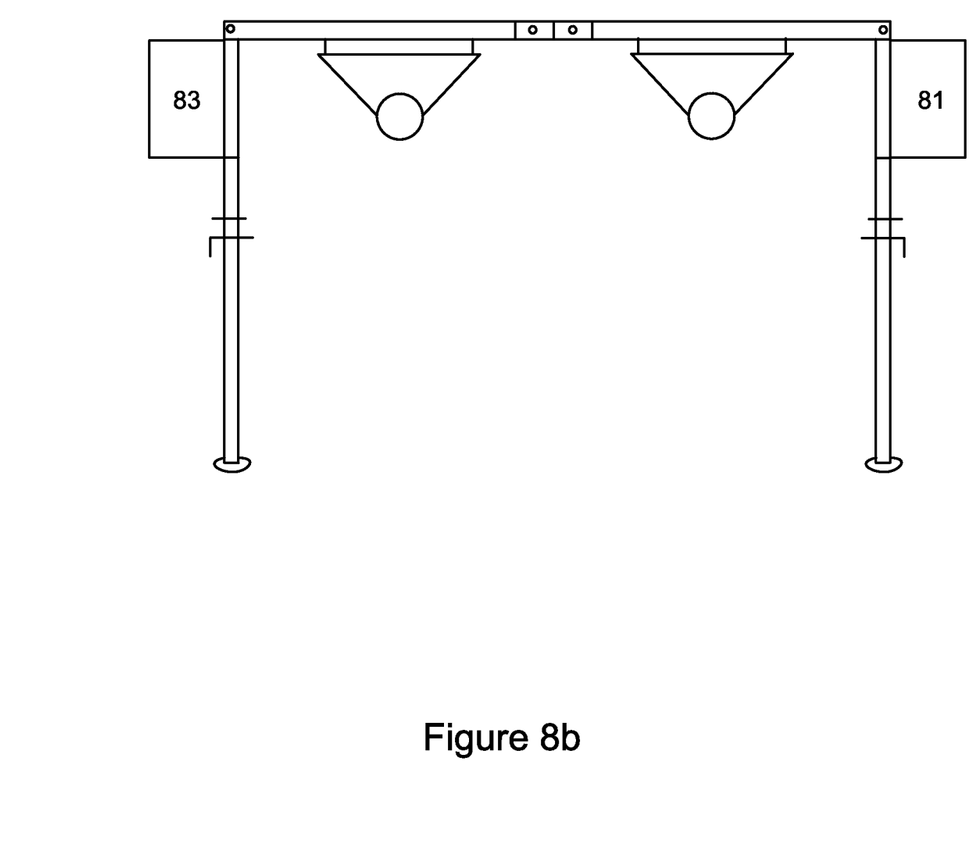
Figure 8C:
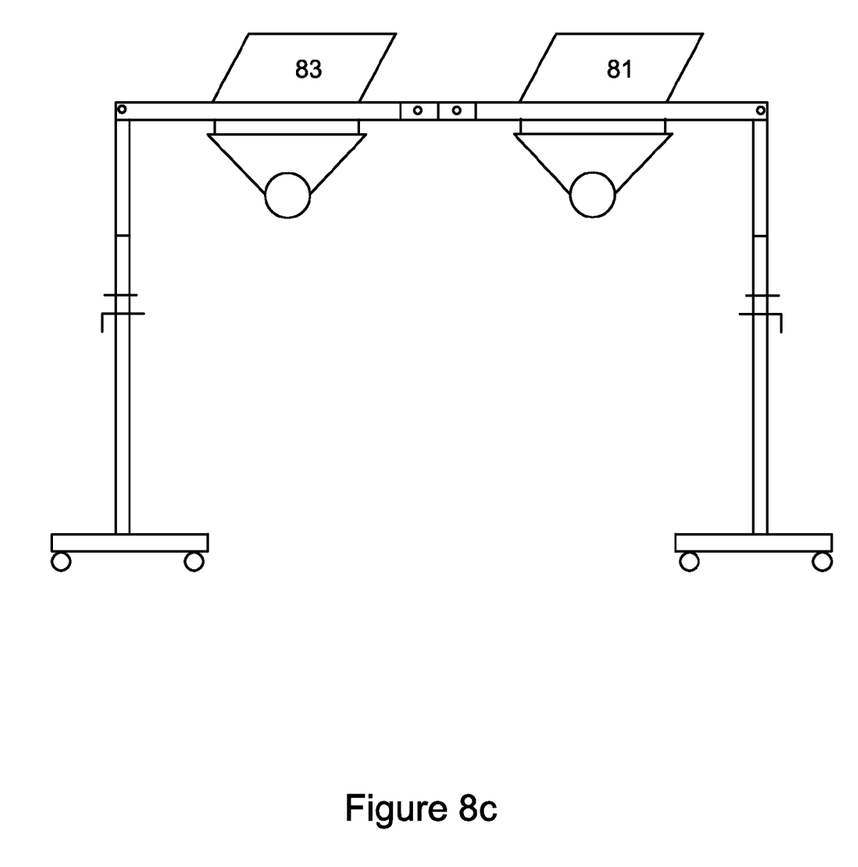
Figure 8D:
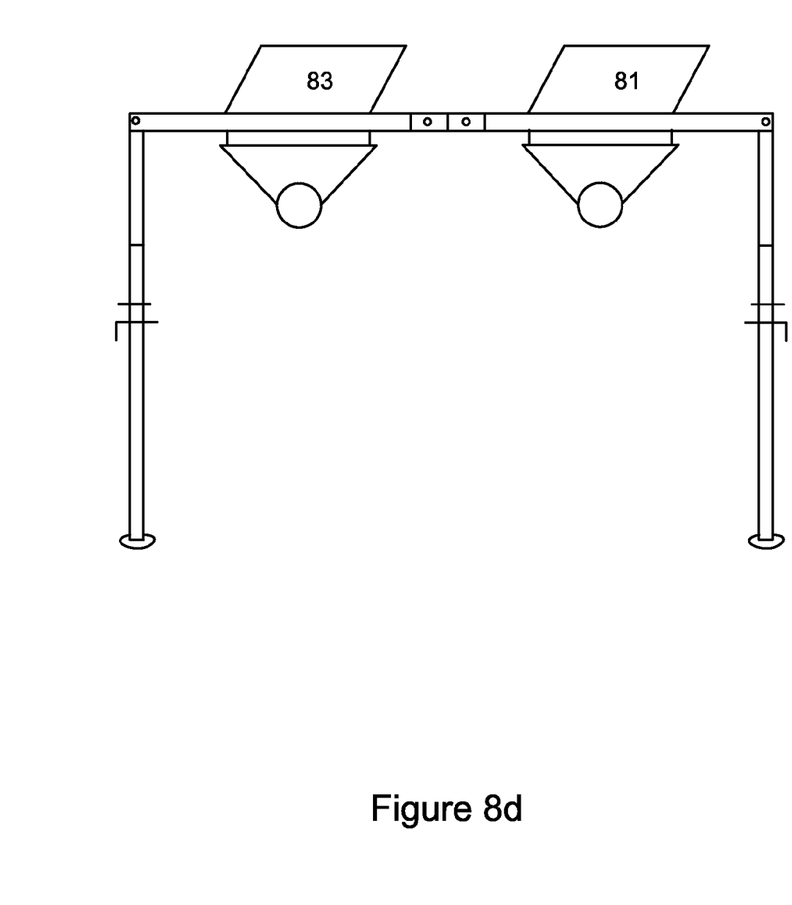

FIGS. 8C and 8D illustrate how a sensor 213 may be attached to connector 101 in some embodiments. Monitor 805 may be attached to each of the support columns 106 and/or to the top of horizontal support beam 106, as shown in some examples in FIGS. 8A-8D.

Figure 6:
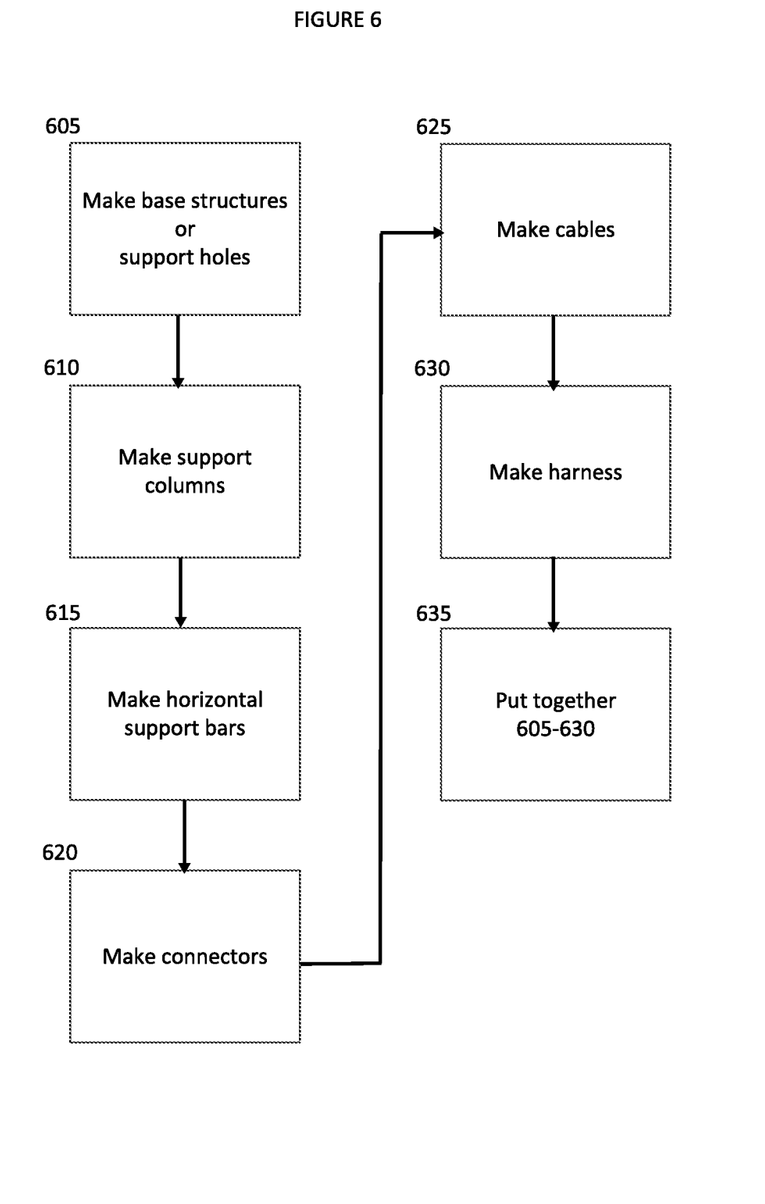
FIG. 6 is a flowchart illustrating how the sports apparatus may be made, according to an embodiment.

In other embodiments of sports apparatus 100 a tracking device 805 may be used instead of monitor 214 and at least one sensor 213. Tracking device 805 may be or comprise a speed tracking device, such as the SKLZ Sport Radar™ Multi-sport speed detection device. Tracking device 805 may be attached to each of the support columns 106 and/or to the top of horizontal support beam 106. FIG. 6 illustrates a flowchart for making the sports apparatus 100, according to embodiments of the invention. In 605, base structures 109 or base support holes 519 are made. The base structures 109 may be made using metal (e.g., lightweight metal, heavier metal, solid metal, hollow metal) and/or plastic (e.g., PVC pipe) and/or other materials. Wheels may be added to base structures 109 to make them mobile. The wheels may be made out of metal and/or plastic and/or other materials. If base support holes 519 are used, these may be made by forming a hole in a floor material, and, in some embodiments, coating the hole with metal and/or plastic, or some other material. In 610, support columns 106 may be made using, for example, metal (e.g., lightweight metal, heavier metal, solid metal, hollow metal) and/or plastic (e.g., PVC pipe) and/or other materials. In some embodiments, support columns 106 may be further coupled to at least one crank 108 that may allow the support columns 106 to be raised or lowered. In some embodiments, a sliding pin 107 may fix the position of the support columns 106 and may allow the position to be locked in place. In 615, horizontal support beam 105 may be made using, for example, metal (e.g., lightweight metal, heavier metal, solid metal, hollow metal) and/or plastic (e.g., PVC pipe) and/or other materials. In some embodiments, horizontal support beam 105 may also be further coupled to at least one crank 108 that may allow horizontal support beam 105 to be raised or lowered. In some embodiments, a sliding pin 107 may fix the position of the horizontal support beam 105 and may allow the position to be locked in place. In some embodiments, both a crank 108 and a sliding pin 107 may be utilized. In 620, one or more connectors 101 may be used by making or cutting a piece of material, such as plastic and/or metal and/or other materials. One or more holes may be cut into connectors 101. In 625, in some embodiments, ties 103 to attach to the ball and connectors 101 may be manufactured using bungee cord and/or rope made of: coated metal fibers, cloth fibers, or elastic fibers, or any combination thereof. In 630, in some embodiments, harness 104 may be made using material such as net and/or nylon and/or other materials. In some embodiments, the ties 103 may be coupled to a harness 104 using clips or hooks, and in other embodiments, the ties 103 may be coupled to a harness 104 by tying the ties to the harness 104. In 635, the base structure 109, support column 106, and the horizontal support beam 105 may be connected to each other being bolted together and/or welding. In some embodiments, bolts may be used in order to make shipping and/or storage easier. In 640, the harness may be connected to the connector 101 using at least one tie 103. The ball can then be placed in the harness.

Alternate embodiments of the base structures 109, the horizontal support beam 105, the support columns 106, or any other element of the sports apparatus 100 can be formed using durable plastic, Plexiglas, or heavier metals.

Figure 7A:
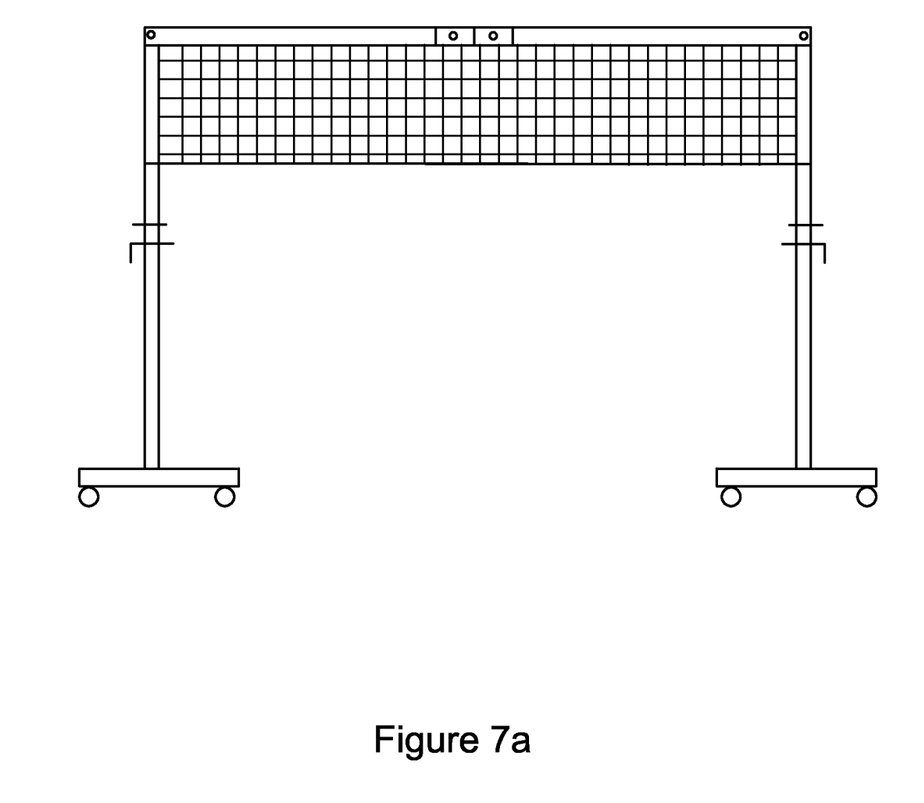
FIGS. 7A-7B illustrates embodiments of a sports net structure 700 that may be used with or in addition to the sports apparatus.
Figure 7B:
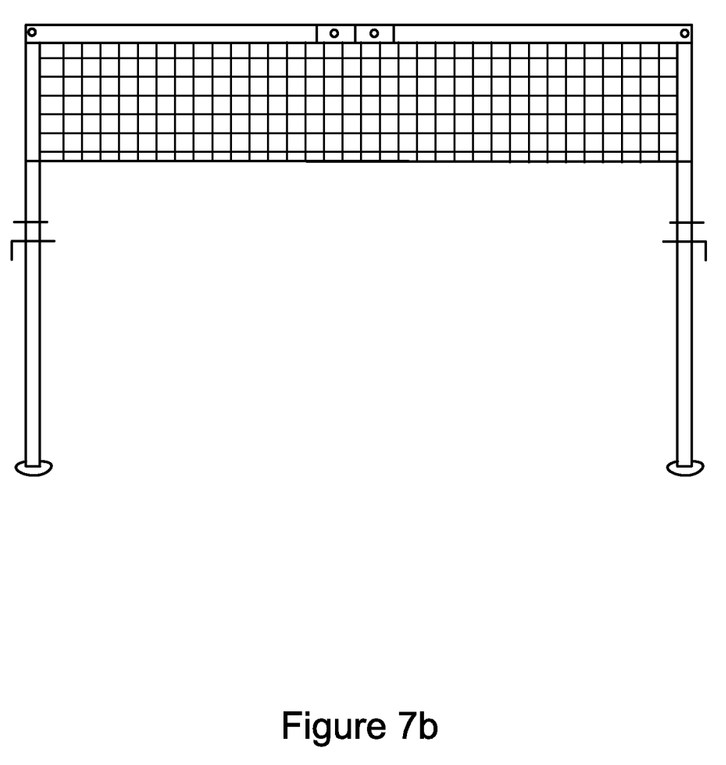

FIG. 7 illustrates a sports net structure 700 that may be used with or in addition to the sports apparatus. Sports net structure 700 may comprise base structures 109, horizontal support beam 105, or support columns 106, or any combination thereof. Any embodiment for any of element for the sports apparatus 100 described in this application may be used in sports net structure 700.

Embodiments of the sports apparatus 100 may allow players and coaches to practice techniques and from with or without a net. Multiple players may use the sports apparatus at one time and/or practice drills may be performed on both sides of the sports apparatus 100, according to some embodiments. In addition, the same apparatus may be used for multiple sports. For example, if two balls are connected to the sports apparatus 100, two volleyball players may practice spiking and blocking on each ball. As another example, a single bungee cord may be used as tie 103 for the ball, and one or more basketball players can practice rebounding. Embodiments of the sports apparatus may be set up outside (e.g., in grass, sand, or a hard surface, such as cement) or inside (e.g., in a gym). Embodiments of the sports apparatus may be made at different scales to accommodate younger players, older players, semi-professional or professional players, etc. Balls may not need to be chased or watched to make sure injuries don't happen. Balls can also be connected in a manner that is best suited for the drill being performed. For example, for a volleyball spiking drill, the coach or player may wish a more secure ball, and may want two or three cables used as ties 103 for the ball, whereas for a basketball rebound drill, the coach or player may wish more movement in the ball, and may want one bungee cord used as one tie 103 for the ball. Furthermore, the apparatus may be raised or lowered to accommodate players of varying skill levels.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

In addition, the terms "comprising", "including", etc. signify "including, but not limited to" in the specification, claims and drawings.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A sports apparatus, comprising:
   at least two support columns;
   at least two base structures coupled to the at least two support columns;
   at least one horizontal support bar coupled to the at least two support columns, wherein the at least one horizontal support bar is moveable and/or adjustable, the at least one horizontal support bar comprising at least two openings; and
   at least one connector disposed entirely below the lower surface of the at least one horizontal support bar, the at least one connector comprising:
      at least two connecting points coupling the at least one connector to the at least one horizontal support bar at a lower surface of the at least one horizontal support bar by engaging with the at least two openings in the at least one horizontal support bar, at least one lower surface that is substantially parallel to the lower surface of the at least one horizontal support bar, and at least three holes in the at least one lower surface of the at least one connector allowing at least one tie to be passed through at least one of the at least three holes of the at least one connector.

2. The apparatus of claim 1, wherein the at least two support columns are movable and/or adjustable.

3. The apparatus of claim 2, further comprising at least one sliding pin fixing the position of the at least two support columns about the at least two base structures.

4. The apparatus of claim 1, wherein the at least two base structures are movable.

5. The apparatus of claim 4, wherein the at least two base structures are configured so that they are able to be slid along a floor surface.

6. The apparatus of claim 1, further comprising at least one harness and at least one tie coupled to the at least one connector and the at least one harness, allowing a ball to be centered about the at least one connector.

7. The apparatus of claim 1, further comprising at least one crank rotatable about at least one rotation axis coupled to the at least two support columns.

8. The apparatus of claim 7, wherein the at least one crank enables the at least two support columns to be vertically raised and/or lowered.

9. The apparatus of claim 1, wherein the at least two base structures support the support columns in a substantially stationary and/or vertical position.

10. The apparatus of claim 1, further comprising at least one monitor coupled to the at least one horizontal support bar, the at least one monitor capable of displaying information transmitted from at least one sensor.

11. The apparatus of claim 1, further comprising at least one locking mechanism coupled to the at least two base structures allowing the at least two base structures to be rendered immobile.

12. The apparatus of claim 1, wherein at least one of the at least two base structures further comprises at least one hollow cavity with at least one opening and/or at least one cap to allow the at least one of the at least two base structures to be filled with a fluid or a plurality of solid particles.

13. The apparatus of claim 1, the at least one horizontal support bar comprising at least two joints.

14. The apparatus of claim 13, wherein the joints allow the at least one horizontal support bar to pivot between substantially horizontal and/or vertical positions.

15. The apparatus of claim 1, further comprising at least one sensor for sensing: speed, force, or impact, or any combination thereof.

* * * * *